United States Patent [19]

Paulucci

[11] Patent Number: 4,574,090
[45] Date of Patent: Mar. 4, 1986

[54] PROCESS OF MAKING A DOUGH CRUST

[76] Inventor: Jeno F. Paulucci, 2020 Washington Dr., Sanford, Fla. 32771

[21] Appl. No.: 583,615

[22] Filed: Feb. 27, 1984

[51] Int. Cl.$^4$ .................................................. A21D 8/00
[52] U.S. Cl. ........................................ 426/439; 426/94
[58] Field of Search ................... 426/89, 94, 95, 138, 426/283, 289, 302, 439, 440, 450, 496, 502, 523, 549, 18, 19, 27

[56] References Cited

U.S. PATENT DOCUMENTS

| | | | |
|---|---|---|---|
| 3,379,141 | 4/1968 | Groth | 107/4 |
| 3,451,358 | 6/1969 | Ruiz | 107/15 |
| 4,170,659 | 10/1979 | Totino et al. | 426/95 |
| 4,208,441 | 6/1980 | Westover | 426/302 |
| 4,285,979 | 8/1981 | Izzi | 426/94 |

Primary Examiner—Raymond Jones
Assistant Examiner—Marianne M. Cintins
Attorney, Agent, or Firm—Willian Brinks Olds Hofer Gilson & Lione Ltd.

[57] ABSTRACT

An improved dough crust made by a process involving baking and then frying is described. The crust has a fried flavor and is especially advantageous for making frozen pizzas. The crust is formed from a sheeted dough piece which has been docked. During the baking step the docking holes bake through. A hard surface forms in them to both prevent oil absorption through the holes and to prevent crust delamination. After the crust has cooled pizza topping can be applied and the crust frozen.

7 Claims, 3 Drawing Figures

PROCESS OF MAKING A DOUGH CRUST

BACKGROUND OF THE INVENTION

1. Field of the Invention

This invention relates to prepared foods and more particularly to dough crusts used for fresh or frozen pizzas or the like.

2. The Prior Art

The prior art includes both baked and fried crusts for pizza and other dough products. It has long been known to either bake or fry such crusts. Examples of baked crusts are found in Groth U.S. Pat. No. 3,379,141 and Ruiz U.S. Pat. No. 3,451,358. Examples of fried crusts are found in Totino et al U.S. Pat. No. 4,170,659 and in the many cookbooks which describe so-called "Neopolitan" pizzas.

In processes described in both these patents, for example, a dough sheet is provided with "docking" holes which allow gas and moisture to be released during frying. The "docking" prosess also fastens top and bottom dough sheet surfaces together and prevents delamination between the upper and lower surfaces of the cooked pizza crust.

SUMMARY OF THE INVENTION

The present invention is embodied in an improved process for making a dough crust product and in the product itself. The crust of the present invention is particularly suited for pizzas and, even more specifically, for frozen pizzas. The improvement results primarily from carrying out the cooking process in two steps. First a docked dough piece is baked for a short period of time. Then the slightly baked dough piece or crust is deep fried for a short period of time.

The initial baking step is effective to partially cook the dough crust. The crust surfaces become somewhat resistant to oil penetration. Baking also seals the interior of the docking holes against substantial oil penetration and prevents them from frying closed. The interior dough is set, delamination being resisted by the baked docking hole connection between upper and lower crust surfaces. In the subsequent frying step the crust absorbs some oil to take on a fried taste, however.

It has been discovered that a lower protein flour can be used in a combined baked-fried crust than with fried crusts, for example. Low protein flour dough, when cooked, results in a crust with superior chewiness and without the toughness that results from using higher protein flour. The dough product is a delamination resistant crust of superior eating quality. It has a bready interior texture, a fried outside appearance with no noticeable blisters, and a crisp bottom.

The thickness of the crust can be varied by varying proofing conditions. It can also be varied by varying the thickness of the original dough sheet.

After the frying step the crust is cooled. Used in a frozen pizza, for example, it is then topped, frozen and packaged.

DETAILED DESCRIPTION OF THE INVENTION

The improved dough product of the present invention can be prepared from low protein flour containing either yeast or chemical leavening. The formula may vary. An example of a preferred dough formula will be hereinafter described.

Figure 1:
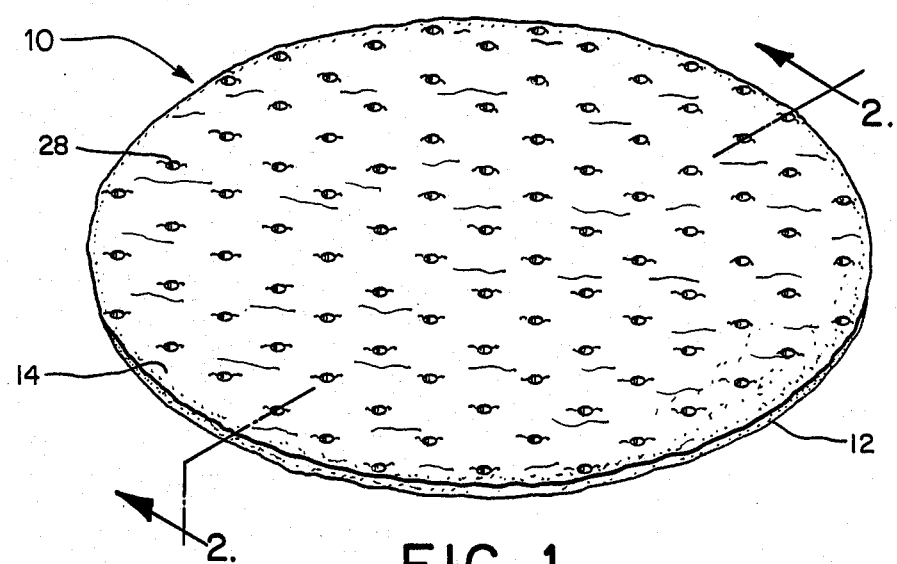
FIG. 1 is a perspective view of an improved dough product embodying features of the invention.
Figure 2:
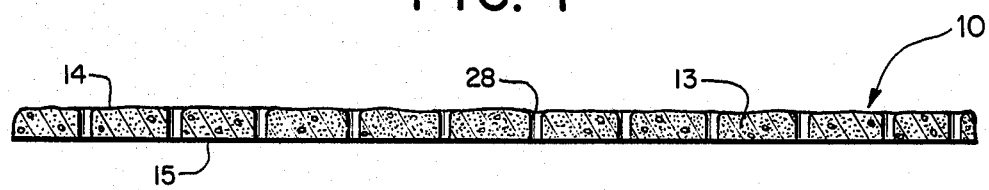
FIG. 2 is a sectional view taken along line 2—2 of FIG. 1.

Referring now both to FIG. 1 and FIG. 2, an improved pizza crust embodying features of the present invention is illustrated generally at 10. The pizza crust 10 is nearly flat and, in this case, circular in shape. It is composed of a porous body 12 of at least partially cooked dough between top and bottom crust surfaces 14 and 15.

The body 12 of dough is substantially uniform in texture throughout its extent. Its porous nature is such that a bready internal structure 13 containing innumerable small pores is formed.

The height of the finished crust 10 is determined primarily by the thickness of the sheeted dough, the moisture and yeast content of the dough, and the proofing time and temperature. Higher moisture and yeast content, as well as longer proofing, produce thicker crusts, for example.

The crust 10 is characterized by having a multiplicity of docking holes 28 which extend from the top surface 14 through the bottom surface 15. These holes 28 are a minimum of one-eighth of an inch in diameter and are spaced about one and one-quarter inches apart. The function of the docking process is primarily to prevent delamination of the crust during the cooking process.

The docking holes 28 must be large enough so that they don't close during cooking, thereby increasing the delamination tendency of the crust. The dough surface through the docking holes 28 is exposed to direct heat during baking. It becomes cooked fairly hard. This creates a bond connecting the upper and lower surfaces 14 and 15 and seals the holes 28 against oil penetration.

The crust surfaces 14 and 15 of the fried crust 10 are quite dense and lack pores compared with the interior. It is preferred that they have a very light color but can, if desired, be fried until substantially darker. The lighter colors are preferred for frozen pizzas since reheating can overcook or burn the crust if it is already a dark brown color.

Because the dough sheet is first partially baked, the subsequent frying does not result in substantial oil absorption by the crust 10. Sufficient oil is absorbed to give a desirable fried dough taste, however. The fat which is absorbed serves as a moisture barrier to prevent absorption of moisture from the surface and tends to preserve the crisp character of the crust surfaces 14 and 15.

Figure 3:
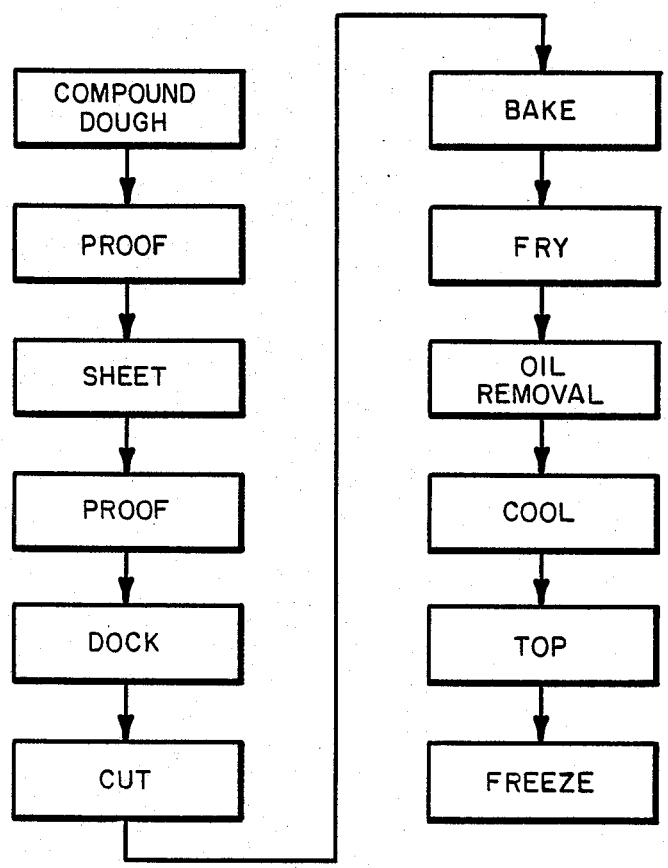
FIG. 3 is a flow chart illustrating the principle steps in the preferred process of the invention.

FIG. 3, is a flow chart illustrating the preferred method for practicing the invention. In the first step dough is prepared. It has been discovered that a dough using low protein flour results in a crust having desired chewiness qualities, whereas dough made from high protein flour results in a tougher crust.

The dough is next extruded and sheeted. A short proof between extrusion and sheeting is desirable. The dough is sheeted down to the desired thickness, between 2 and 10 mm. The sheet is dusted with corn starch to prevent sticking on rollers and belts used for sheeting. The dough sheet is then proofed from two and one-half to fifteen minutes at 85° to 110° F. and ambient humidity to allow the dough to rise further. After proofing the dough sheet is docked by piercing it all the way through. The preferred spacing is one and one-quarter inches apart in both directions throughout the width and breadth of the sheet. The dough sheet is then cut into pieces of any desired shape.

Baking is then carried out in an oven of conventional design for thirty-eight to sixty seconds at 375° to 550° F. The partially cooked pizza crusts are moved from the oven immediately into a conventional submerging fryer for thirteen to eighteen and one-half seconds at 390° to 415° F.

The initial baking sets the dough structure. The crust surfaces are hardened somewhat. This occurs through the docking holes also.

The frying steps result in some oil absorption. Excess oil is removed from the surface of the product after frying in any conventional manner.

After frying and oil removal, the product is cooled either by letting it stand in the air or passing it through a cooler. The latter procedure is preferred for large scale production.

After cooking the topping is applied in a well known manner. Toppings are then applied and the product is frozen and packaged.

The invention will be understood more completely by reference to the following:

EXAMPLE 1

| 1. Dough Formula | Per Batch |
|---|---|
| Flour | 500.000 lbs. |
| Brew Slurry* | 109.000 lbs. |
| Water (Variable) | 225.000 lbs. |
| Salt | 7.500 lbs. |
| Monocalcium Phosphate | 3.000 lbs. |
| Sodium Bicarbonate | 2.500 lbs. |
| Dextrose | 1.875 lbs. |
| Calcium Propionate | 1.500 lbs. |
| Whey | 1.400 lbs. |
| Sodium Stearoyl Lactylate | 1.250 lbs. |
| Succinylated monoglyceride and distilled monoglyceride | 0.250 lbs. |
| Soybean Oil | 2.500 lbs. |
| TOTAL: | 855.775 lbs. |
| Brew Slurry | Per Batch |
| Water | 60.00 lbs. |
| Yeast (fresh crumbles) | 40.00 lbs. |
| Dextrose | 8.50 lbs. |
| Buffer | 0.39 lbs. |
| Salt | 0.23 lbs. |
| Soybean Oil | 0.04 lbs. |
| | 109.16 lbs. |

2. Raw Materials
   A. Flour - low protein; produces doughs with less shrinkage and crusts having desired chewiness without toughness.
   Farinograph - Data based on 14.0% moisture flour

| Absorption | 56.5 ± .1 (%) |
   |---|---|
   | MTI | 35 ± 5 |
   | Mixing Tolerance | 9.0 ± 1 (min) |
   | Mix Peak | 6.5 ± 1 (min) |

Analytical

| Moisture | 13.0 ± .5 |
   |---|---|
   | Protein | 9.5 to 9.8 |
   | Ash | .48 ± .03 |

B. Yeast - the most critical ingredient in pizza crusts or bread leavened products is active in the fermentation (proof) time and initial onset of the baking.
   C. Salt - Enhances the flavor of the pizza crusts.
   D. Monocalcium Phosphate - Chemical leavener used with 80 parts of sodium bicarbonate to neutralize pH - produces $CO_2$ which aids in leavening during baking.
   E. Dextrose - Provides fermentable carbohydrates for yeast activity and aids in crust color development during baking.
   F. Whey - Provides fermentable carbohydrates for yeast activity and browning of the crusts.
   G. Sodium Stearoylate Lactylate (SSL) - Is highly functional in improving volume and more tender eating properties.
   H. Succinylated Monoglyceride and Distilled Monoglyceride
   Reducing agent, dough conditioner aids in improving volume and eating qualities.
   I. Soybean Oil
   Aids in lubrication to reduce sticking and aids in flow characteristics for uniformity of shape.
   J. Brew Buffer - Controls brew activity at optimum level for yeast activity (pH 4.8 to 5.3).

3. Dough Preparation
   Mixer - horizontal bar mixer.
   Mixer time - 7 minutes ± 1 minute at high speed for developing dough after 1 minute at low speed for mixing.
   Dough Temperature out of mixer - 78 to 82° F.
   Dough extruded on to 36 inch belt where it proofs as it travels to the first sheeting roller.

4. Sheeting
   Dough sheeted down to desired amount of dough per square inch in a series of 3 sheeting rollers.
   Dough is dusted with corn starch on top and on bottom to prevent sticking on rollers and belts 5. Proofing
   Variable proofing time ranges from 2.5 minutes to 15 minutes.
   Proof temperature - 85° F. to 110° F.
   Humidity - Ambient 6. Docking
   Dough is docked with dockers which penetrate through the sheeted dough spaced 1¼" apart - the docking holes prevent delamination of crusts during the cooking process.

7. Dough Cutting

| Crust Size | Cutter Size | Raw Wt. | Raw/wt. per Sq. In. | Fin- ished Weight | Finished Wt. per Sq. In. |
|---|---|---|---|---|---|
| 12" | 13.0" | 10.5 Oz. | 0.791 | 9.7 Oz. | 0.805 |
| 10" | 10.85" | 8.0 Oz. | 0.865 | 7.4 Oz. | 0.942 |
| 9.25" | 10.0" | 6.25 Oz. | 0.795 | 5.8 Oz. | 0.863 |
| 8.25" | 9.0" | 5.5 Oz. | 0.865 | 5.0 Oz. | 0.930 |
| 2" | 2.2" | .292 Oz. | 0.601 | .229 Oz. | 0.730 |

8. Baking
   Jet Sweep oven
   48 feet long heating area
   4 Zones
   52 feet total length
   Bake Time - 38 to 60 seconds
   Oven Temperature - 374° to 550° F.

9. Frying
   Deep fried in edible oil
   Frying Time - 13 to 18.5 seconds
   Frying Temperature - 390 to 415° F.

10. Cooling
    through spiral cooler down to between 70° -90° F.

11. Finished Product Specifications
    Crust dimension - size ±.25 inches
    Crust weight - weight ±.2 ounces
    Crust moisture - 32% ± 4%
    Crust fat content - no higher than 10%
    Cooled temperature 80° F. ± 10° F.
    Crust Height - .475 ± .025 inches While the product and process embodiments described herein are presently preferred, it should be understood that various modifications and improvements may be made therein, and it is intended to cover in the appended claims all such modifications and improvements as fall within the true spirit and scope of the invention.

What is desired to be claimed and secured by Letters Patent of the United States is:

1. A process of preparing a crust comprising the sequential steps of:
   (a) producing a dough sheet having upper and lower surfaces;
   (b) docking the dough sheet to provide a plurality of spaced-apart docking holes that extend through the dough sheet and to connect the upper and lower dough surfaces, said holes being large enough such that they do not close during cooking;
   (c) cutting the sheet into individual dough pieces;
   (d) baking each dough piece at a temperature and for a time sufficient to partially cook the dough thereby, forming a set, uniform bready interior and harder surfaces, the upper and lower dough surfaces and the surfaces through the docking holes being exposed to direct heat during baking and becoming hard forming a bond between the upper and lower surfaces of the dough, and sealing the dough surfaces against substantial oil penetration; and
   (e) frying the partially cooked dough piece after the baking step for a time sufficient to cause said dough piece to have a fried outside appearance, a bready interior texture, and a crisp outer surface.

2. The process of claim 1 wherein:
   (a) said baking step is effective to harden the internal surface of said docking holes through the crust to fasten upper and lower surfaces of the crust together and prevent delamination.

3. The process of claim 2 further including the steps of:
   (a) subjecting the dough sheet to proofing at an elevated temperature; and
   (b) docking the dough sheet after said proofing.

4. The process of claim 1 wherein said baking and frying steps include:
   (a) baking the dough piece in an oven for a minute or less at a temperature of 375° to 550° F.; and
   (b) submerged frying said dough piece for less than twenty seconds at a temperature of 390° to 415° F.

5. A process of preparing a crust comprising the sequential steps of:
   (a) preparing a sheet of dough using a wheat flour and having upper and lower surfaces;
   (b) proofing the dough sheet;
   (c) docking the dough sheet to provide a plurality of spaced-apart docking holes which extend through the dough sheet and to connect the upper and lower dough surfaces, said holes being large enough such that they do not close during cooking;
   (d) cutting the sheet into individual dough pieces;
   (e) baking each dough piece at a temperature and for a time sufficient to partially cook the dough forming a set, uniform, bready interior, the upper and lower dough surfaces and the surfaces through the docking holes being exposed to direct heat during baking and becoming hard forming a bond between the upper and lower surfaces of the dough, and sealing the dough surfaces against substantial oil penetration; and
   (f) submerging the partially-cooked piece in heated fat at a temperature and for a time sufficient to fry the baked dough.

6. The process of claim 5, wherein:
   (a) said wheat flour has a protein content of 10% or less.

7. The process of claim 5 wherein:
   (a) said proofing comprises resting said dough sheet before docking for from two and one-half to fifteen minutes and at a temperature of 85° to 110° F.

* * * * *